US009850370B2

(12) United States Patent
Georgelos et al.

(10) Patent No.: US 9,850,370 B2
(45) Date of Patent: Dec. 26, 2017

(54) ADDITIVE FOR PERFORMANCE ENHANCEMENT OF PLA ARTICLES

(71) Applicant: CLEAR LAM PACKAGING, INC., Elk Grove Village, IL (US)

(72) Inventors: Paul Georgelos, Naperville, IL (US); Pat Montefusco, Genoa, IL (US); Javier Soria, West Chicago, IL (US)

(73) Assignee: CLEAR LAM PACKAGING, INC., Elk Grove Village, IL (US)

( * ) Notice: Subject to any disclaimer, the term of this patent is extended or adjusted under 35 U.S.C. 154(b) by 0 days.

(21) Appl. No.: 14/519,667

(22) Filed: Oct. 21, 2014

(65) Prior Publication Data

US 2015/0112013 A1    Apr. 23, 2015

Related U.S. Application Data

(60) Provisional application No. 61/893,752, filed on Oct. 21, 2013.

(51) Int. Cl.
| | | |
|---|---|---|
| *C08L 33/00* | (2006.01) | |
| *C08L 23/08* | (2006.01) | |
| *C08J 3/22* | (2006.01) | |
| *C08J 5/18* | (2006.01) | |

(52) U.S. Cl.
CPC ........... *C08L 23/0853* (2013.01); *C08J 3/226* (2013.01); *C08J 5/18* (2013.01); *C08J 2367/04* (2013.01); *C08J 2423/08* (2013.01); *C08J 2433/00* (2013.01); *C08J 2467/04* (2013.01); *C08L 2310/00* (2013.01)

(58) Field of Classification Search
CPC ...................................................... C08L 33/00
USPC .................. 524/524; 525/190, 166; 521/138
See application file for complete search history.

(56) References Cited

U.S. PATENT DOCUMENTS

| | | |
|---|---|---|
| 3,976,618 A | 8/1976 | Takida et al. |
| 4,436,863 A | 3/1984 | Albee, Jr. et al. |
| 5,053,482 A | 10/1991 | Tietz |
| 5,097,004 A | 3/1992 | Gallagher et al. |
| 5,097,005 A | 3/1992 | Tietz |
| 5,295,985 A | 3/1994 | Romesser et al. |
| 2004/0054054 A1 | 3/2004 | Blondel et al. |
| 2005/0131120 A1 | 6/2005 | Flexman |
| 2008/0071008 A1 | 3/2008 | Smillie et al. |
| 2009/0263600 A1 | 10/2009 | Miyashita et al. |
| 2010/0015420 A1 | 1/2010 | Riebel et al. |
| 2010/0240801 A1* | 9/2010 | Nelson .................... C08L 67/04 523/122 |
| 2011/0226789 A1* | 9/2011 | Georgelos ............... B32B 27/18 220/677 |
| 2012/0164364 A1 | 6/2012 | Mehlmann |

FOREIGN PATENT DOCUMENTS

| | | |
|---|---|---|
| WO | WO-2008/036334 A2 | 3/2008 |
| WO | WO2013/028857  * | 2/2013 |

OTHER PUBLICATIONS

Biostrength 280 Impact Modifier data sheet, Arkema, Inc. 2010.
Ma et al., Toughening of poly(lactic) acid by ethylene-co-vinyl acetate copolymer with different vinyl acetate contents, Eur. Polymer J., 48(1):146-54 (Nov. 3, 2011).
International Search Report and Written Opinion, International Application No. PCT/US14/61604, dated Jan. 6, 2015.
EVA data sheet, "HDT @0.46 Mpa (67 psi)" Retrieved from Internet Apr. 25, 2016: <http://omenexus.specialchem.com/polymer-properties/properties/hdt-0-46-mpa-67-psi>.
International Search Report and Written Opinion, corresponding International application No. PCT/US2014/061604, dated Apr. 26, 2016.
Extended European Search Report, European patent application No. EP14856027.9, dated May 24, 2017.

* cited by examiner

*Primary Examiner* — Deve E Valdez
(74) *Attorney, Agent, or Firm* — Marshall, Gerstein & Borun LLP

(57) ABSTRACT

Embodiments of the invention relate to method and an additive for a PLA article comprising at least one acrylic impact modifier between 10 and 80 weight % of the total weight of the additive; and at least one vinyl acetate ethylene copolymer (EVA) having ≥12 Wt % vinyl acetate, the EVA between 5 and 50 weight % of the additive; and at least one PLA carrier resin between 5 and 50 weight % of the total weight of the additive.

26 Claims, 12 Drawing Sheets

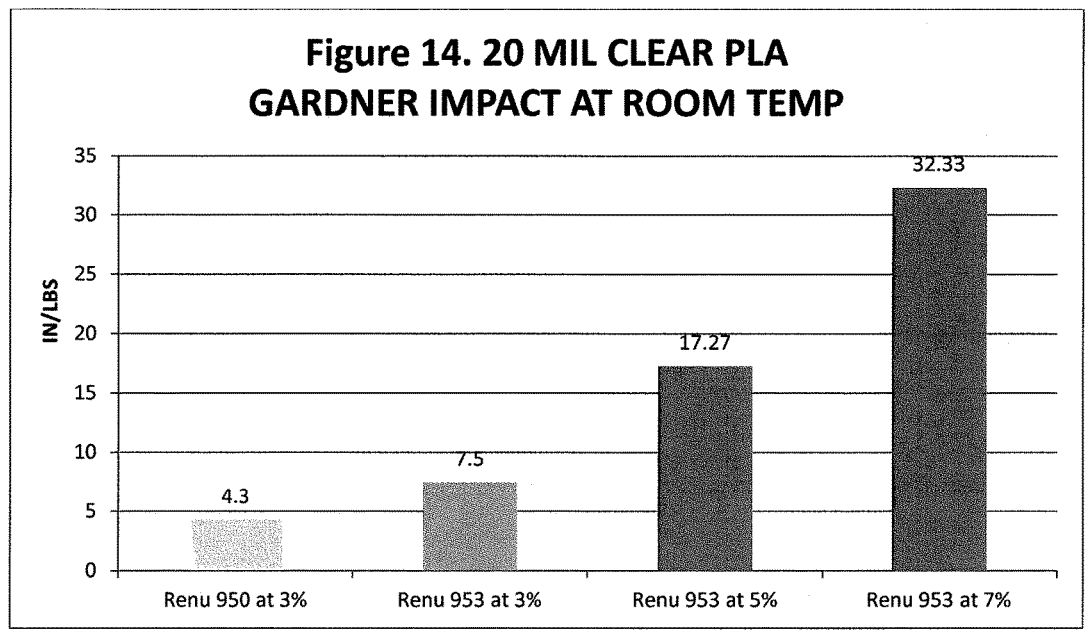

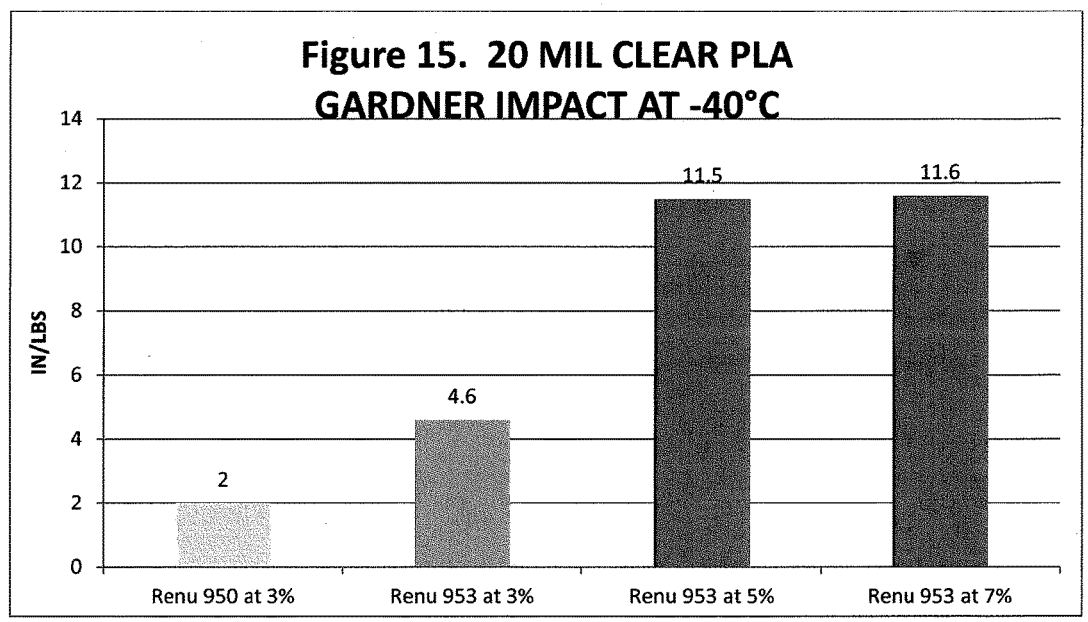

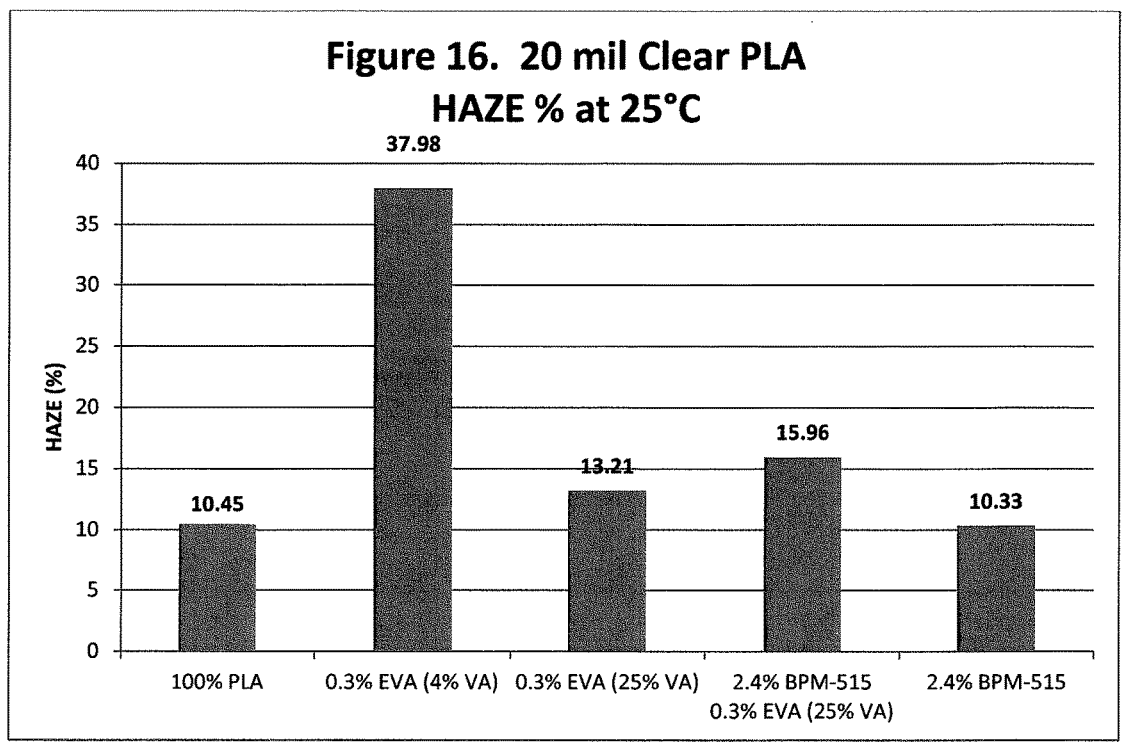

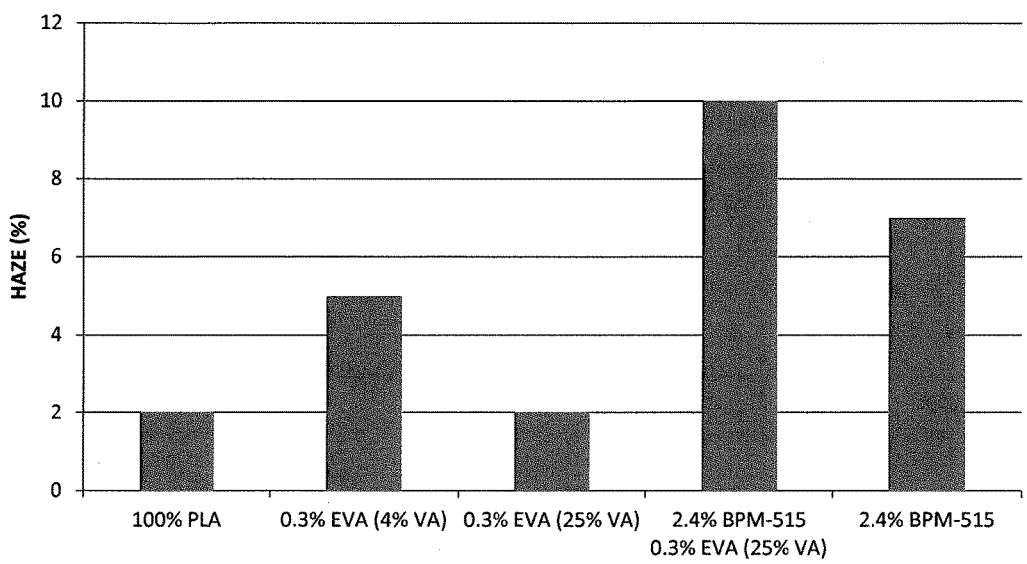

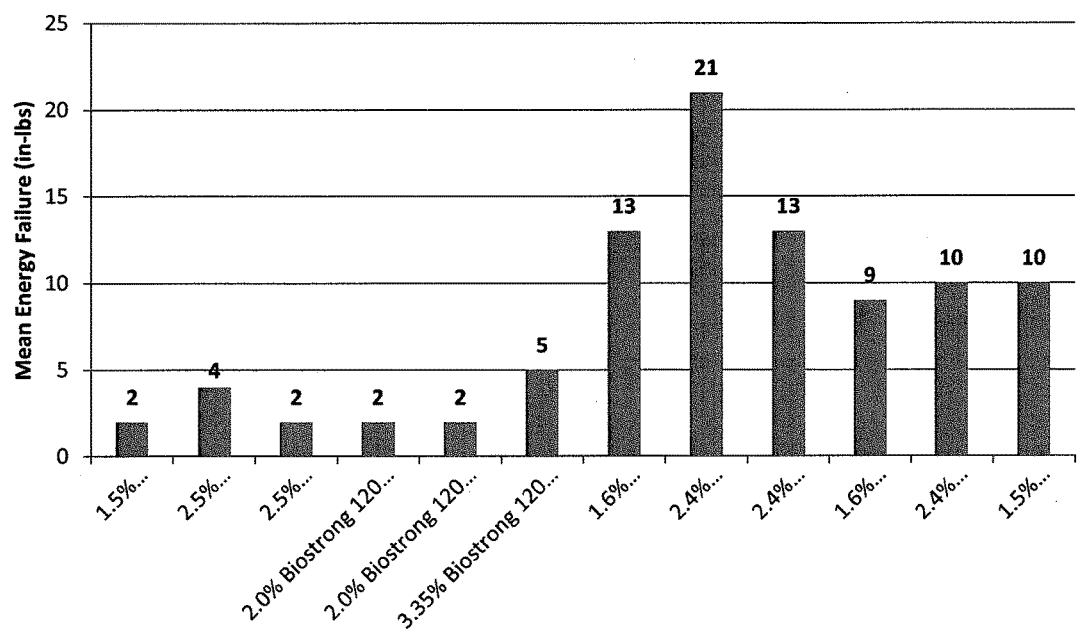

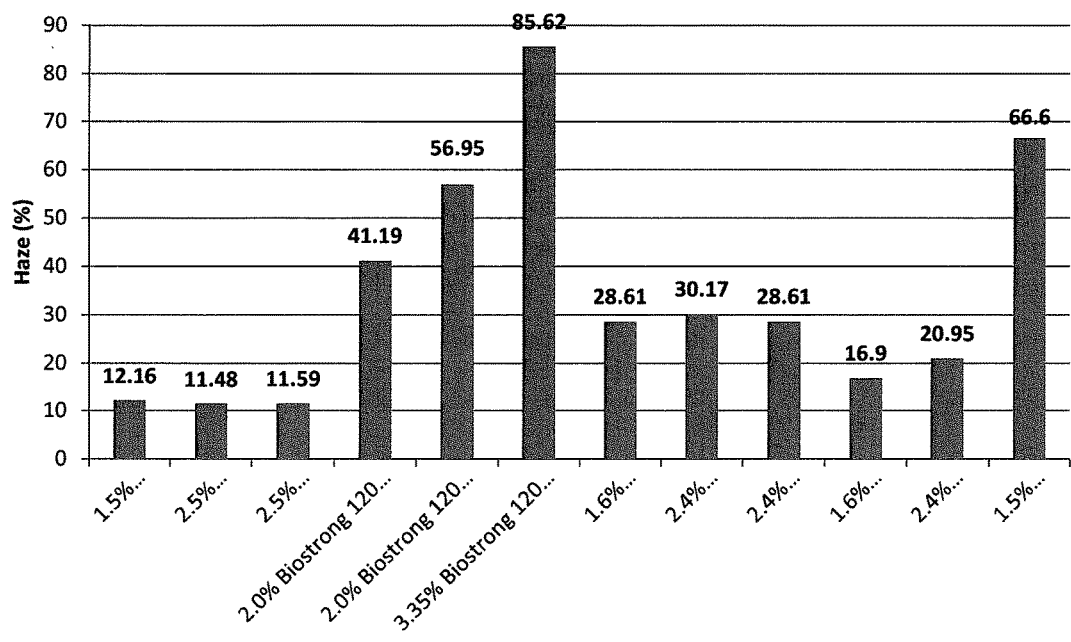

ADDITIVE FOR PERFORMANCE ENHANCEMENT OF PLA ARTICLES

CROSS REFERENCE TO RELATED APPLICATION

This application claims priority from U.S. Provisional Application Ser. No. 61/893,752 filed Oct. 21, 2013, the complete subject matter of which is incorporated herein by reference in its entirety. The provisional application incorporates the following related patent applications, assigned to the same assignee hereof and disclose related subject matter, the complete subject matter of each of which is incorporated herein by reference in its entirety: BiopolymerRoll stock for Form-Fill-Seal Packaging, U.S. Ser. No. 13/069,327; Thermoforming Biopolymer Sheeting, U.S. Ser. No. 13/069,260 and Additive for Performance Enhancement of Biopolymer Articles, U.S. Ser. No. 61/826,921.

FIELD OF THE INVENTION

The invention relates to additives that enhance the performance of PLA articles. More particularly, the invention relates to acrylic impact modifiers in combination with ethylene vinyl acetate copolymers (EVA) used to create PLA articles, including sheets or molded articles, enhancing the performance of the sheets and articles having excellent impact resistance and good clarity.

BACKGROUND OF THE INVENTION

Currently petroleum-based polymers or non-biodegradable materials and blends are used to form sheets or molded parts. Such materials are not readily degradable and are therefore considered undesirable. One approach to this problem has been to use PLA sheeting or a PLA blend including a Polylactic Acid polymer (PLA) or copolymer with a second polymer to form such rigid structures. Unfortunately, current PLA materials and blends are not suitable for forming such rigid structures, in that such current PLA materials are not useful for producing molded parts having the desired impact resistance and are further unsuited for drawing depth to width ratios within the desired temperature forming windows as required by the packaging industry to produce such rigid structures.

For the foregoing reasons, it would be desirable to have an additive that enhances the performance of PLA articles.

SUMMARY OF THE INVENTION

Embodiments relate to an additive for a PLA article, where the additive includes at least one acrylic impact modifier between 50-80 weight % of the total weight of the additive; and at least one ethylene vinyl acetate copolymer between 10-20 weight % of the total weight of the additive and compounded in a carrier resin, where the carrier resin is between 10-20 weight % of the total weight of the additive.

Other embodiment relate to an additive for a PLA article including at least one polylactic acid polymer (PLA) between 10-25 weight % of the total weight of the additive; at least one ethylene vinyl acetate copolymer between 10-50 weight % of the total weight of the additive; and at least one acrylic impact modifier, between 35-80 weight % of the total weight of the additive.

Still other embodiments relate to a PLA sheet containing an additive for a PLA article, the sheet including at least one polylactic acid polymer (PLA) between 90-98 weight % of the total weight of the sheet; at least one ethylene vinyl acetate copolymer (EVA) between 0.2-4.0 weight % of the total weight of the sheet; and at least one acrylic impact modifier, between 1.5-6.0 weight % of the total weight of the sheet.

Yet other embodiments relate to a PLA sheet containing the additive provided above, for a PLA article, the sheet including at least one polylactic acid polymer (PLA) between 90-97.5 weight % of the total weight of the sheet; the additive between 2-9.5 weight % of the total weight of the sheet; and at least one foaming agent, between 0.5-5 weight % of the total weight of the sheet.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

FIG. 14 is a graph showing the impact resistance (expressed as Gardner Impact values in in-lbs) for different compositions of PLA article/sheeting having a gauge of 20 mil at Room Temp;

FIG. 15 is a graph showing the impact resistance (expressed as Gardner Impact values in in-lbs) for different compositions of PLA article/sheeting having a gauge of 20 mil at −40° C.;

FIG. 16 is a graph showing the clarity (expressed as a percentage of Haze) for different compositions of PLA article/sheeting having a gauge of 20 mil at 25° C.;

FIG. 17 is a graph showing the impact resistance (expressed as Gardner Impact values in in-lbs) for different compositions of PLA article/sheeting having a gauge of 20 mil at 25° C.;

FIG. 18 is a graph showing the impact resistance (expressed as Gardner Impact values in in-lbs) for different compositions of PLA article/sheeting having a gauge of 40-42 mil at 25° C.;

FIG. 19 is a graph showing the clarity (expressed as a percentage of Haze) for different compositions of PLA article/sheeting having a gauge of 40-42 mil at 25° C.

Throughout the various figures, like reference numbers refer to like elements.

DETAILED DESCRIPTION OF PRESENTLY PREFERRED EMBODIMENTS

Figure 1:
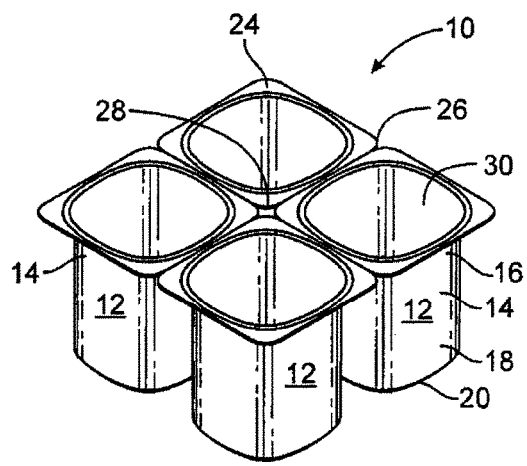
FIG. 1 is a view of a PLA article in accordance with one embodiment.
Figure 3:
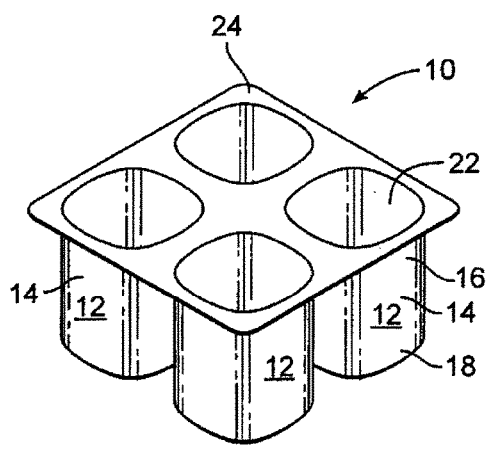
FIG. 3 is yet another view of a PLA article of FIG. 1 in accordance with one embodiment.
Figure 2:
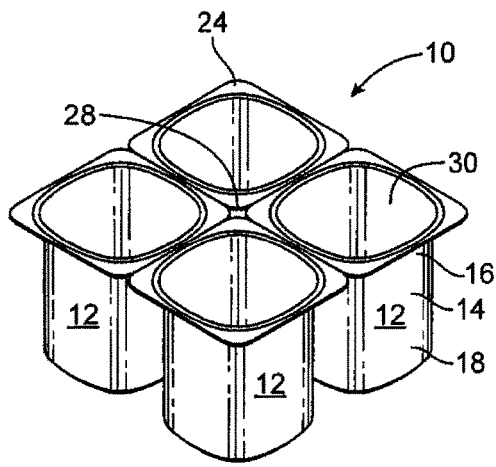
FIG. 2 is another view of the PLA article of FIG. 1 in accordance with one embodiment.
Figure 4:
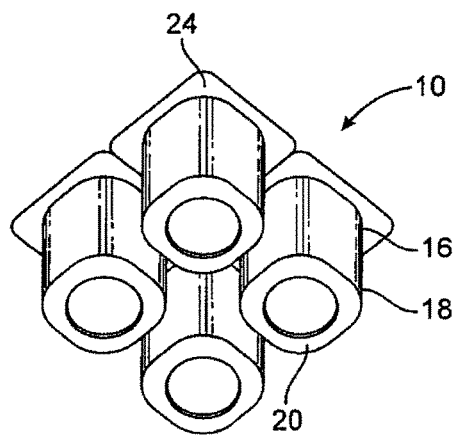
FIG. 4 is still another of the PLA article of FIG. 1 in accordance with one embodiment.

Embodiments of the present invention relate to a container and a method of forming the container as illustrated in FIGS. 1-3. FIG. 1 depicts different embodiments of the container having different shaped compartments. In at least one embodiment, the container 10 includes at least one compartment 18, at least one constricted section 20, first end 22 and second end 24 opposite the first end 22. One other embodiment relates to container 110 including at least one compartment 118, at least one constricted section 120, first end 122 and second end 124 opposite the first end 122. The container 210 includes at least one sphere-like compartment 218, at least one constricted section 220, first end 222 and second end 224 opposite the first end 222. Further, container 310 includes at least one cube-like compartment 318, at least one constricted section 320, first end 322 and second end 324 opposite the first end 322. While the different shapes including sphere-like and cube-like compartments are illustrated, any shape is contemplated including stars, moons, vehicles and the like.

In describing the presently preferred embodiments and methods according to the invention, a number of terms will be used, the definitions or scope of which will now be described.

As defined herein, the term "impact resistance" refers to the mean failure energy of materials (alternatively referred to as "MFE" expressed in in-lbs) according to the energy required to cause 50% of the specimens to crack or break flat, rigid plastic specimens under various specified conditions of impact of a striker impacted by a falling weight and is expressed as Gardner Impact values (i.e. MFE) as described in the associated ASTM Designation D 5420-04—Standard Test Method for Impact Resistance of Flat, Rigid Plastic Specimen by Means of a Striker Impacted by a Falling Weight (Gardner Impact) incorporated herein as one of the Attachments.

As defined herein, the term "multilayered film", "multilayered films", "multilayered sheet", "multilayered structure" or "one or more layers" refers to a plurality of layers in a single film or substrate structure generally in the form of a sheet or web which may be made from a polymer material, a non-polymer material, a bio-polymer material, some combination thereof or the like for example, bonded together by any conventional means known in the art (co-extrusion, extrusion coating, lamination, solvent coating, emulsion coating, suspension coating, adhesive bonding, pressure bonding, heat sealing, thermal lamination, ultrasonic welding, some combination thereof or the like for example).

As defined herein, the term "polymer" refers to the product of a polymerization reaction, and is inclusive of homopolymers, copolymers, terpolymers, or the like for example, the layers of a film or film substrate can consist essentially of a single polymer, or can have still additional polymers together therewith, i.e., blended therewith.

As defined herein, the term "copolymer" refers to polymers formed by the polymerization of at least two different monomers. For example, the term "copolymer" includes the co-polymerization reaction product of ethylene and an alpha-olefin, such as 1-hexene. The term "copolymer" is also inclusive of, for example, the co-polymerization of a mixture of ethylene, propylene, 1-propene, 1-butene, 1-hexene, and 1-octene. As defined herein, a copolymer identified in terms of a plurality of monomers, e.g., "propylene/ethylene copolymer", refers to a copolymer in which either monomer may co-polymerize in a higher weight or molar percent than the other monomer or monomers. Of particular importance are copolymers of ethylene and vinyl acetate (EVAs). These copolymers can range from very low levels of vinyl acetate (2 weight %) to very high levels (40 weight %). However, the first listed monomer preferably polymerizes in a higher weight percent than the second listed monomer.

As defined herein, the term "coextruded" refers to a material formed by the process of extruding two or more polymeric materials through a single die with two or more orifices arranged so that the extrudates merge and weld together into a laminar structure before chilling and solidifying. The substrates described herein may be generally prepared from dry resins which are melted in an extruder and passed through a die to form the primary material, most commonly in tube or sheet form. In the coextruded films described herein, all layers were simultaneously coextruded, cooled via water, chilled metal roll, or air quenching. Unless otherwise noted, the resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the film, by blending prior to extrusion. The resins and any additives are introduced to an extruder where the resins are melt plasticized by heating and then transferred to an extrusion (or co-extrusion) die for formation into a tube or any other form using any suitable extrusion method. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

As defined herein a "polymer sheet" or "sheeting" refers to a material composed of polymers and having a thickness of about 10 mil (0.01 inches) or greater, while a "polymer film" is defined as a material composed of polymers and having a thickness of less than 10 mil (0.01 inches).

As defined herein, the term "rigid" refers to a material capable of holding or retaining its original shape of form or returning to its original shape or form under return to initial conditions and is substantially firm in final form.

As defined herein the term "biodegradable" refers to material which, when exposed to an aerobic and/or anaerobic environment, ultimately results in the reduction to monomeric components due to microbial, hydrolytic, and/or chemical actions. Under aerobic conditions, biodegradation leads to the transformation of the material to end products such as carbon dioxide and water. Under anaerobic conditions, biodegradation leads to the transformation of the materials to carbon dioxide, water, and methane. The biodegradability process is often described as mineralization. Biodegradability means that all organic constituents of the films are subject to decomposition eventually through biological or any other natural activity.

Non-limiting examples of other optional ingredients that may be included in the film, sheet or laminate described herein include aromatic/aliphatic polyester copolymers made more readily hydrolytically cleavable, and hence more likely biodegradable, such as those described in U.S. Pat. Nos. 5,053,482; 5,097,004; 5,097,005; and 5,295,985; biodegradable aliphatic polyesteramide polymers, polycaprolactones, polyesters or polyurethanes derived from aliphatic polyols (i.e., dialkanoyl polymers), polyamides including polyethylene/vinyl alcohol copolymers, cellulose esters or plasticized derivatives thereof, salts, slip agents, crystallization accelerators such as nucleating agents, crystallization retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, antiblocking agents, antistatic agents, or mixtures thereof. Slip agents may be used to help reduce the tackiness or coefficient of friction in the film. Also, slip agents may be used to improve film stability, particularly in high humidity or temperatures.

FIGS. 1-4 depict views of a PLA article, generally designated 10, in accordance with one embodiment. In one embodiment, the article 10 is formed via any suitable manner including coextrusion, blow molding, thermoforming and the like.

In the embodiment illustrated in FIGS. 1-4, article 10 comprises four cups 12 (alternatively referred to as a 4-pack), arranged in two rows of two, where each cup 12 has a longitudinal sidewall 14, having first end 16 and second end 18, and bottom 20 at second end 18 (best viewed in FIG. 4) defining compartment or chamber 22 (best viewed in FIG. 3) adapted to receive a material (yogurt or other foodstuffs/materials). The cup 14 may have a depth to width ratio of 10:1 to 2:1; and/or scored for separation into individual compartments. In at least one embodiment, cup 12 has 4 longitudinal sidewalls 14 (two sets of two opposing sidewalls 14) joined or connected to bottom 20.

FIGS. 1-4 further illustrate cup 12 having a lip, flange or strip 24 at end 16, joining the individual cups 12 together. In at least one embodiment, the 4-pack 10 is formed as a single article, then the lip 24 is cut and scored (forming score lines 26 for example) into a multi-compartment, breakaway cups as is well known in the art. In the illustrated embodiment, the star punch 28 is formed, enabling easy separation of the individual cups 12. In at least one embodiment, article 10 includes lidstock 30 sealing compartment or chamber 22 (See FIG. 1-2).

Figure 5:
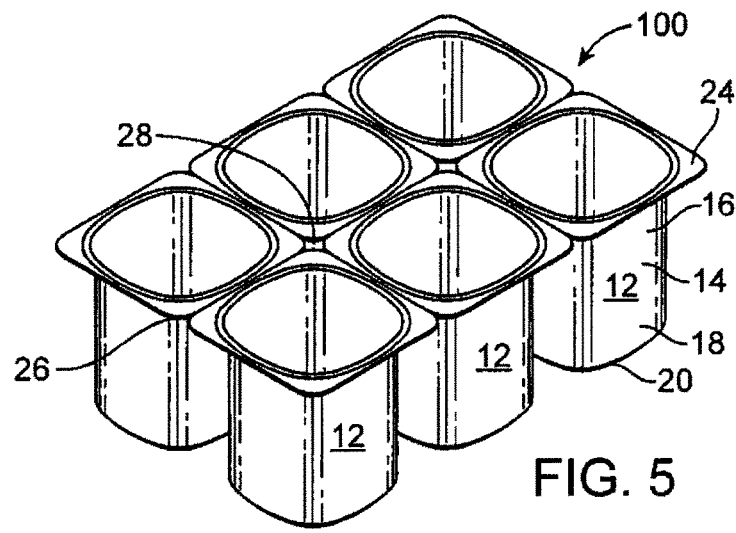
FIG. 5 is a view of another PLA article in accordance with one embodiment.
Figure 6:
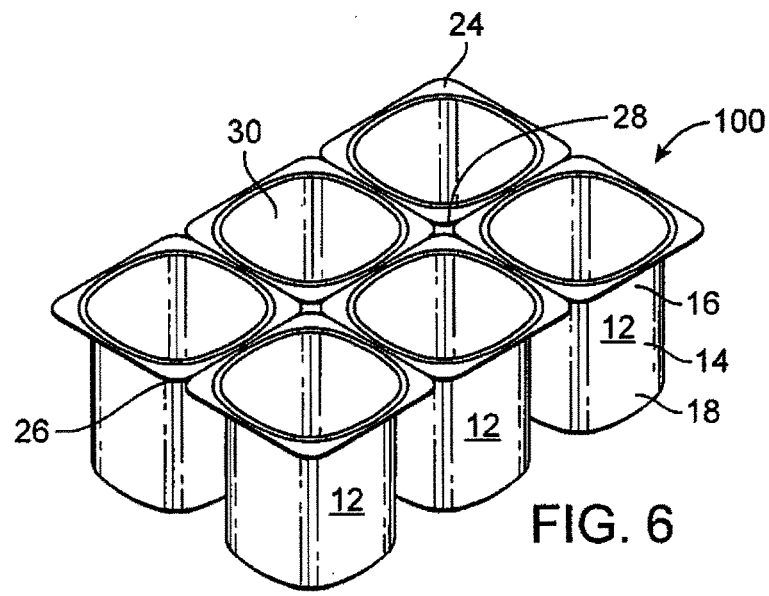
FIG. 6 is another view of the PLA article of FIG. 5 in accordance with one embodiment.
Figure 7:
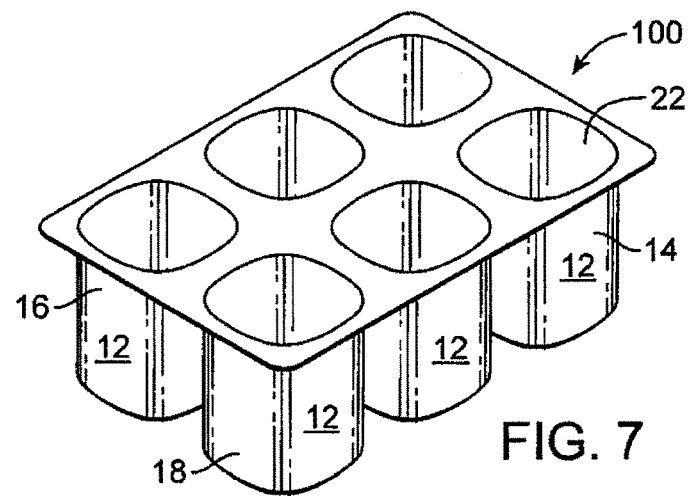
FIG. 7 is another view of the PLA article of FIG. 5 in accordance with one embodiment.

FIGS. 5-7 depict another view of a PLA article, generally designated 100, in accordance with one embodiment. In one embodiment, the article 100 is formed via any suitable manner including injection molding, blow molding, thermoforming and the like. In the embodiment illustrated in FIGS. 5-7, article 100 comprises six cups 12 (alternatively referred to as a 6-pack), arranged in two rows of three, where each cup 12 has a longitudinal sidewall 14, first and second ends 16 & 18, and bottom 20 defining compartment or chamber 22 adapted to receive a material (yogurt or other foodstuffs/materials) and lip 24.

Figure 8:
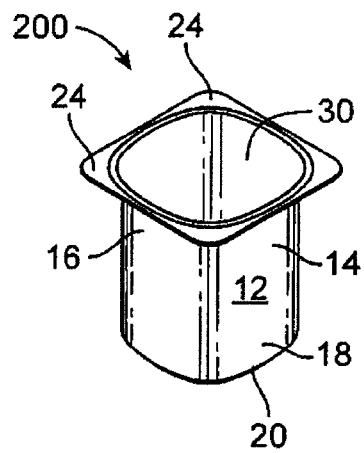
FIG. 8 is a view of yet another PLA article in accordance with one embodiment.
Figure 9:
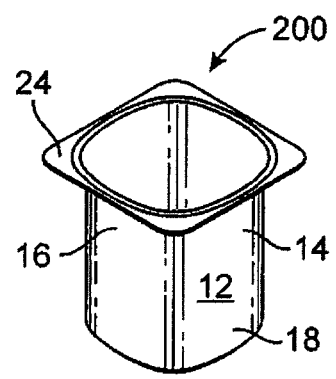
FIG. 9 is another view of the PLA article of FIG. 8 in accordance with one embodiment.
Figure 10:
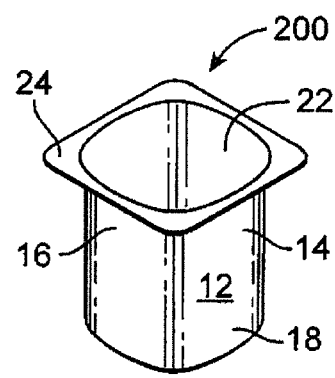
FIG. 10 is another view of the PLA article of FIG. 8 in accordance with one embodiment.

FIGS. 8-10 depict another view of a PLA article, generally designated 200, in accordance with one embodiment. In one embodiment, the article 200 is formed via any suitable manner including injection molding, blow molding, thermoforming and the like. In the embodiment illustrated in FIGS. 8-10, article 200 comprises a single cup 12 having a longitudinal sidewall 14, first and second ends 16 & 18 and bottom 20 defining compartment or chamber 22 adapted to receive a material (yogurt or other foodstuffs/materials) and lip 24.

Figure 11:
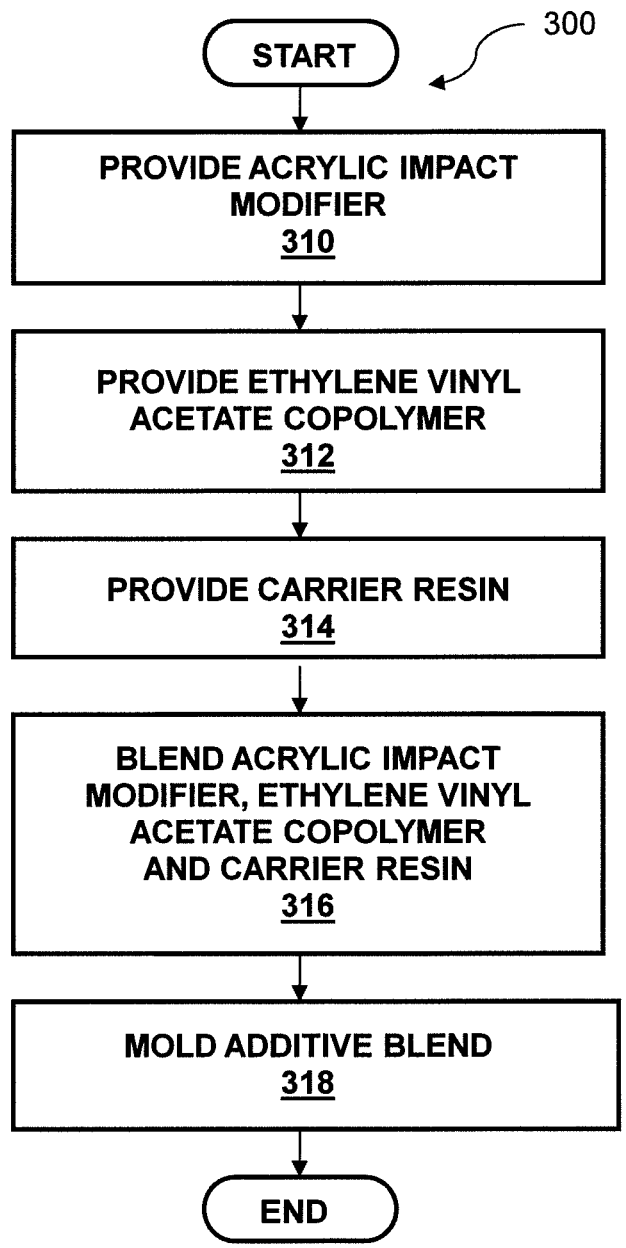
FIG. 11 is a flowchart of a method for forming an additive in accordance with one embodiment.

FIG. 11 illustrates a flowchart of a method for forming an additive, generally designated 300, in accordance with one embodiment. The method 300 includes providing at least one acrylic impact modifier, block 310, at least one ethylene vinyl acetate copolymer, block 312 and at least one PLA carrier resin, block 314. The at least one acrylic impact modifier, at least one ethylene vinyl acetate copolymer (EVA) and the at least one PLA carrier resin are blended forming an additive blend, block 316, where the at least one acrylic impact modifier is between 10-80 weight % of the total weight of the additive blend, the at least one ethylene vinyl acetate copolymer is between 10-50 weight % of the total weight of the additive blend and the at least one PLA carrier resin is between 10-50 weight % of the total weight of the additive blend. The additive blend is then molded, block 318. More particularly, the additive blend may be pelletized under water method to form microbeads. While a water method is discussed, any method for forming/pelletizing is contemplated.

One or more embodiment relates to an additive for a PLA article. The additive includes at least one impact modifier between 10-90 weight % of the total weight of the additive; and at least one EVA compounded in a PLA carrier resin, where the PLA carrier resin is between 10-50 weight % of the total weight of the additive.

In at least one embodiment the additive includes at least one acrylic impact modifier between 10-90 weight % of the total weight of the additive; at least one ethylene vinyl acetate copolymer between 5-50 weight % of the total weight of the additive; and at least one PLA carrier resin between 5-50 weight % of the total weight of the additive. Embodiments may include the at least one acrylic impact modifier is DOW Paraloid BPM-515; the at least one ethylene vinly acetate copolymer is DuPont Elvax 350, and the at least one PLA carrier resin is Natureworks 2003D.

Yet another embodiment may include a pellet, where the pellet includes at least one acrylic impact modifier between 10-90 weight % of the total weight of the pellet; at least one ethylene vinyl acetate copolymer between 5-50 weight % of the total weight of the pellet; and at least one PLA carrier resin between 5-50 weight % of the total weight of the pellet. Embodiments of the pellet may include the least one impact modifier is DOW Paraloid BPM-515, the at least one ethylene vinyl acetate is DuPont Elvax 350 and/or the at least one PLA carrier resin is Natureworks 2003D.

Figure 12:
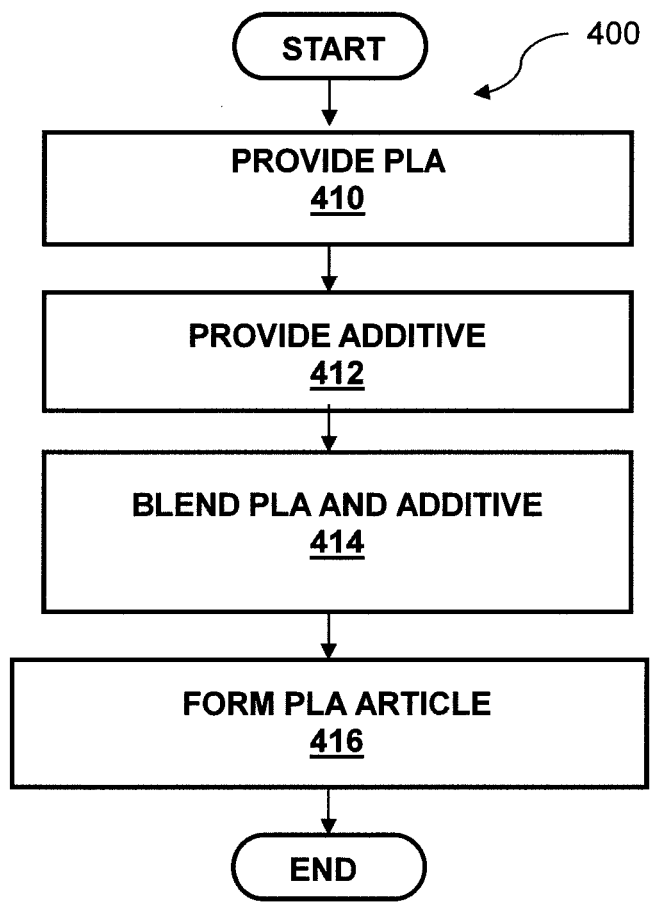
FIG. 12 is a flowchart of a method for forming a PLA article using an additive similar to that of FIG. 10 in accordance with one embodiment.

FIG. 12 is a flowchart of a method for forming a PLA article, generally designated 400 using an additive similar to that provide above. Method 400 includes providing a PLA resin, block 410, and an additive, block 412. The PLA resin and additive are blended, block 414 and a PLA article is formed, 416.

In at least one embodiment the PLA article includes at least one PLA resin between 90-98 weight % of the total weight percent of the PLA article; and an additive between 2-10 weight % of the total weight percent of the PLA article, where the additive includes at least one acrylic impact modifier between 10-90 weight % of the total weight of the additive; at least one ethylene copolymer between 5-50 weight % of the total weight of the additive; and at least one PLA carrier resin between 5-50 weight % of the total weight of the additive.

In one or more embodiments, the PLA article has a predetermined thickness and impact resistance, where the predetermined impact resistance has a Gardner Impact value between 3 and 50 in-lbs and has a Gardner Impact value of about 10 in-lbs at 40 mil thickness. Embodiments are contemplated wherein the predetermined thickness is between about 10 mil and 80 mil thick.

In one or more embodiments, the at least one PLA resin is between 80-96 weight % of the total weight of the article, the at least one impact modifier is between 2-10 weight % of the total weight of the article, the at least one polymer color concentrate is between 2-10 weight % of the total weight of the article.

Embodiments are contemplated in which the carrier resin is functionalized polylactic acid polymer; and the carrier PLA resin is a resin selected from the group consisting of polylactic acid polymers (PLA), ethylene vinyl acetate copolymer polymers, poly (3-hydroxyalkanoate) polymers (PHA); or aliphatic-aromatic polyesters.

Figure 13:
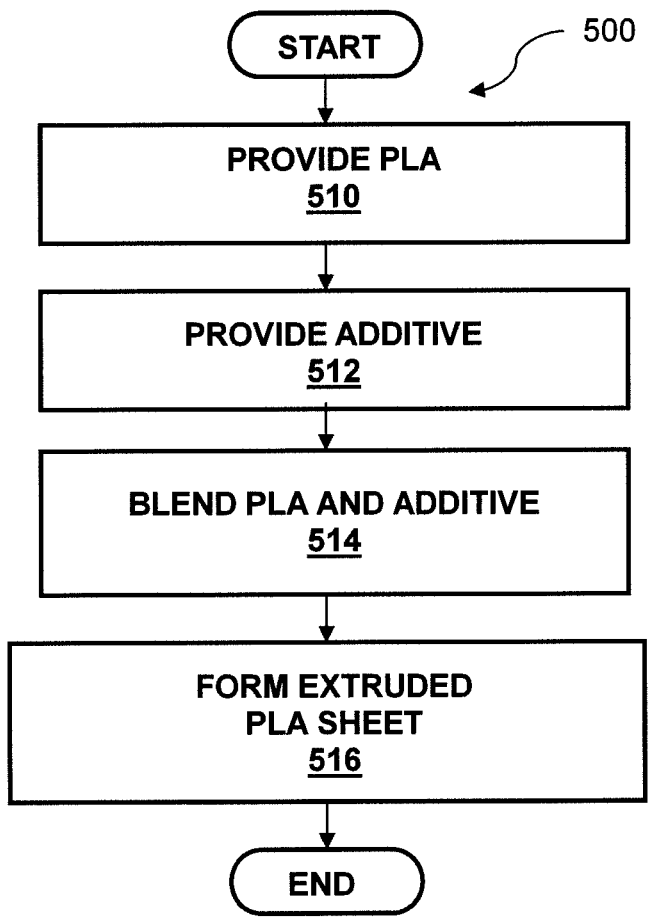
FIG. 13 is a flowchart of a method for forming a PLA sheeting using an additive in accordance with one embodiment.

FIG. 13 illustrates a flowchart of a method for forming PLA sheeting using an additive similar to that provided previously, generally designated 500, in accordance with one embodiment. Method 500 includes providing a PLA resin, block 510, and an additive, block 512. The PLA resin and additive are blended, block 514, and the PLA sheeting is extruded, block 516.

The PLA extruded sheeting includes at least one PLA resin between 90-98 weight % of the total weight of the extruded sheet; and an additive between 8-30 weight % of the total weight of the sheeting; where the additive contains at least one impact modifier between 10-90 weight % of the total weight of the additive; at least one polymer color concentrate between 5-50 weight % of the total weight of the additive; and at least one PLA carrier resin between 5-50 weight % of the total weight of the additive. Additionally, the sheet could contain a foaming agent between 0.5-5 weight % of the overall blend to produce a foamed PLA sheeting.

The PLA sheeting may, in one or more embodiments, have a predetermined thickness and impact resistance, where the predetermined impact resistance has a Gardner Impact value between 3 and 50 in-lbs. More specifically, the sheeting may have Gardner Impact value of about 10 in-lbs at 40 mil thickness. The predetermined thickness is between about 10 mil and 80 mil.

Embodiments are contemplated in which the PLA sheeting includes the at least one PLA resin is between 70-90 weight % of the total weight of the sheeting, the at least one impact modifier is between 2-15 weight % of the total weight of the sheeting, the at least one ethylene vinyl acetate copolymer is between 2-15 weight % of the total weight of the sheeting and the at least one PLA carrier resin is between 2-10% of the total weight of the sheeting.

In one embodiment, the PLA sheeting is a monolayer or multilayer sheet, and is used as a single sheet or has another sheet joined thereto. The PLA sheeting is between about 10 mil and 80 mil thick, more particularly between about 12 mil and 50 mil thick and has a predetermined temperature forming window between 180° F. and 350° F., more particularly between 220° F. and 275° F. In at least one embodiment, the cup may having a range of depth to width ratios of 10:1 to 1:4, where embodiments are contemplated having ranges of depth to width ratios of 10:1 to 2:1, ranges of depth to width ratios of 8:1 to 4:1. and ranges of depth to width ratios of 2:1 to 1:4 2:1 to 1:4, alternatively 10:1 to 2:1 (8:1 to 4:1 for example).

One or more embodiments of the present invention illustrate the synergistic benefit of linking both an acrylic impact modifier and low levels of ethylene vinyl acetate (EVA). Different levels of vinyl acetate in the EVA can modify the optics or clarity of the resulting products. For example, using a high vinyl acetate (>12% VA) provides products with reasonably good optics and very good impact resistance. In one or more embodiments provided below, the PLA sheeting has a predetermined impact resistance, MFE or energy that will cause 50% of the specimens to fail or crack or break the sheeting under various specified conditions as provided previously and in the associated ASTM Designation D 5420-04—Standard Test Method for Impact Resistance of Flat, Rigid Plastic Specimen by Means of a Striker Impacted by a Falling Weight (Gardner Impact) incorporated herein as one of the attachments of 6 in-lbs or greater. In one embodiment, the PLA sheeting has a Gardner Impact value greater than 6 in-lbs, more particularly between 6 and 100 in-lbs or 6 and 150 in-lbs, and even still more particularly about 10 in-lbs @ 40 mil as provided below in the Tables below.

FIG. 14 is a graph showing the impact resistance (expressed as Gardner Impact values in in-lbs) for different compositions of PLA article/sheeting having a gauge of 20 mil at Room Temp as further provided below in Table 1.

TABLE 1

| Test Number | Item | Additive % | Gardner Impact In-lbs |
|---|---|---|---|
| 1 | Renu 950 at 3% | 1.5% BPM-515 | 4.3 |
| 2 | Renu 953 at 3% | 0.3% EVA (25% VA) 4.0% BPM-515 | 7.5 |
| 3 | Renu 953 at 5% | 0.5% EVA (25% VA) 5.6% BPM-515 | 17.27 |
| 4 | Renu 953 at 7% | 0.7% EVA (25% VA) | 32.33 |

FIG. 15 is a graph showing the impact resistance (expressed as Gardner Impact values in in-lbs) for different compositions of PLA article/sheeting having a gauge of 20 mil at −40° C. as provided further below in Table 2.

TABLE 2

| Test Number | Additive % | Gardner Impact In-lbs |
|---|---|---|
| 1 | 1.5% BPM-515 | 2.0 |
| 2 | 0.3% EVA (25% VA) 4.0% BPM-515 | 4.6 |
| 3 | 0.5% EVA (25% VA) 5.6% BPM-515 | 11.5 |
| 4 | 0.7% EVA (25% VA) | 11.6 |

FIG. 16 is a graph showing the clarity (expressed as a percentage of Haze) for different compositions of PLA article/sheeting having a gauge of 20 mil at 25° C. of FIG. 15 and Table 8 as provided further below in Table 3.

TABLE 3

| Test Number | Additive % | Haze % |
|---|---|---|
| 1 | 100% PLA | 10.45 |
| 2 | 0.3% EVA (4% VA) | 37.98 |
| 3 | 0.3% EVA (25% VA) | 13.21 |
| 4 | 2.4% BPM-515 0.3% EVA (25% VA) | 15.96 |
| 5 | 2.4% BPM-515 | 10.33 |

FIG. 17 is a graph showing the impact resistance (expressed as Gardner Impact values in in-lbs) for different compositions of PLA article/sheeting having a gauge of 20 mil at 25° C. of FIG. 16 and Table 3 above as provided further below in Table 4.

TABLE 4

| Test Number | Additive % | Gardner Impact In-lbs |
|---|---|---|
| 1 | 100% PLA | 2 |
| 2 | 0.3% EVA (4% VA) | 5 |
| 3 | 0.3% EVA (25 VA) | 2 |
| 4 | 2.4% BPM-515 0.3% EVA (25% VA) | 10 |
| 5 | 2.4% BPM-515 | 7 |

FIG. 18 is a graph showing the impact resistance (expressed as Gardner Impact values in in-lbs) for different compositions of PLA article/sheeting having a gauge of 40-42 mil at 25° C. as further provided in Table 5.

TABLE 5

| Test Number | Additive % | Gardner Impact In-lbs |
|---|---|---|
| 1A | 0 | 2 |
| 1B | 1.5% BPM-515(S) | 2 |
| 2 | 2.5% BPM-515(S) 2.5% | 4 |
| 3 | 2.5% BPM-515(O) | 2 |
| 4 | 2.0% Biostrong 120(S) | 2 |
| 5 | 2.0% Biostrong 120(O) | 2 |
| 6 | 3.35% Biostrong 120(S) | 5 |
| 7 | 1.6% BPM-515 0.2% EVA (25% VA) (O) | 13 |
| 8 | 2.4% BPM-515 0.3% EVA (25% VA) (S) | 21 |
| 9 | 2.4% BPM-515 0.3% EVA (25% VA) (O) | 13 |
| 10 | 1.6% BPM-515 0.2% EVA (40%) (O) | 9 |
| 11 | 2.4% BPM-515 0.3% EVA (40% VA) (O) | 10 |
| 12 | 1.5% BPM-515 0.3% EVA (4% VA) (O) | 10 |

FIG. 19 is a graph showing the clarity (expressed as a percentage of Haze) for different compositions of PLA article/sheeting having a gauge of 40-42 mil at 25° C. as illustrated in FIG. 18 and Table 5 as provided below in Table 6.

TABLE 6

| Test Number | Additive % | Haze % |
|---|---|---|
| 1A | 0 | 10.0 |
| 1 | 1.5% BPM-515(S) | 12.16 |
| 2 | 2.5% BPM-515(S) 2.5% | 11.48 |
| 3 | 2.5% BPM-515(O) | 11.59 |
| 4 | 2.0% Biostrong 120(S) | 41.19 |
| 5 | 2.0% Biostrong 120(O) | 56.95 |
| 6 | 3.35% Biostrong 120(S) | 85.62 |
| 7 | 1.6% BPM-515 0.2% EVA (25% VA) (O) | 28.61 |
| 8 | 2.4% BPM-515 0.3% EVA (25% VA) (S) | 30.17 |
| 9 | 2.4% BPM-515 0.3% EVA (25% VA) (O) | 28.61 |
| 10 | 1.6% BPM-515 0.2% EVA (40%) (O) | 16.9 |

TABLE 6-continued

| Test Number | Additive % | Haze % |
|---|---|---|
| 11 | 2.4% BPM-515 0.3% EVA (40% VA) (O) | 20.95 |
| 12 | 1.5% BPM-515 0.3% EVA (4% VA) (O) | 66.6 |

The data in the Tables, specifically Tables 5-6, indicates that the impact strength of the control sheeting (Test #1) is 0.05 in*lbs/mil. However, the data further indicates that the impact strength of the PLA sheeting including the acrylic impact modifier and ethylene vinyl acetate copolymer is 0.25 to 0.5 in*lbs/mil, which is 5 to 10 times greater than the control sheet.

FIGS. 18-19 depict a graph showing the impact resistance (expressed as Gardner Impact (values in in-lbs) for different compositions of PLA sheeting having a gauge of 40-42 mil; while FIG. 2 is a graph showing the haze % for different compositions of PLA sheeting having a gauge of 40-42 mil. Samples 1b through 3 use just the acrylic impact modifier at 1.5% and 2.5% levels and demonstrate little to no impact resistance improvement. However, once a very small amount (0.2 to 0.3 wt %) of EVA copolymer is used (samples 6-12) a dramatic increase in impact resistance is demonstrated. There is a synergistic interaction between the acrylic impact modifier and the EVA copolymer such that it dramatically improves the toughness of PLA sheeting. In FIG. 2, we present the haze % of each sheet. We see that using low vinyl acetate EVAs (4 weight % vinyl acetate) creates a very hazy sheet. This is unacceptable for most consumer applications where good clarity is required. However, it was found that using high vinyl acetate EVAs (12 weight % to 50 weight % vinyl acetate) yields both good clarity and excellent impact resistance. It is surprising to see that high VA EVAs are very compatible in a PLA matrix. The combination of high vinyl acetate content EVAs and acrylic impact modifiers being used in clear PLA sheeting and it leading to both a synergistic and dramatically elevated impact resistance and good clarity is the inventive concept.

As provided previously, the PLA sheeting is a monolayer or multilayer material, and is used as a single material or has one or more materials joined or applied thereto. In at least one embodiment, the PLA sheeting may be comprised of at least two layers of materials, where the two layers are comprised of the same or different materials. For example, the at least two layers of materials may be comprised of the same or different PLA materials or one or more layers comprised of PLA material and one or more layers comprised of non-PLA material. Additionally, it is contemplated that other materials may be joined or blended with the PLA material. For example, one or more different PLA materials, one or more non-PLA materials or some combination thereof may be combined with, or compounded in, the PLA resin (a functionalized carrier resin for example), which in turn is blended with the at least one acrylic impact modifier and at least one ethylene vinyl acetate forming the PLA sheeting.

Embodiments relate to an additive for a PLA article, where the additive includes at least one acrylic impact modifier between 50-75 weight % of the total weight of the additive; and at least one ethylene vinyl acetate copolymer polymer between 10-25 weight % of the total weight of the additive and compounded in a carrier resin, where the carrier resin is between 10-25 weight % of the total weight of the additive.

Other embodiments relate to an additive for a PLA article including at least one polylactic acid polymer (PLA) between 15-25 weight % of the total weight of the additive; at least one ethylene vinyl acetate copolymer between 50-75 weight % of the total weight of the additive; and at least one ethylene vinyl acetate copolymer polymer, between 10-25 weight % of the total weight of the additive.

In one or more embodiments, the at least one acrylic impact modifier is Paraloid BPM-515 and/or the carrier resin is a material selected from the group consisting of polylactic acid polymer (PLA), poly (3-hydroxyalkanoate) polymer (PHA), polycaprolactone and functionalized polylactic acid.

Still other embodiments relate to a PLA sheet containing an additive similar to that provided previously for a PLA article, the sheet including at least one polylactic acid polymer (PLA) between 90-97.3 weight % of the total weight of the sheet; at least one ethylene vinyl acetate copolymer between 0.2-3 weight % of the total weight of the sheet; and at least one acrylic impact modifier between 2.0 to 10.0 weight % of the sheet; and at least one foaming agent between 0.5 to 5.0 weight % of the total weight of the sheet.

Yet other embodiments relate to a PLA sheet containing an additive similar to that provided previously for a PLA article, the sheet including at least one polylactic acid polymer (PLA) between 90-94.5 weight % of the total weight of the sheet; the additive between 5-10 weight % of the total weight of the sheet; and at least one foaming agent, between 0.5-5 weight % of the total weight of the sheet.

In one or more embodiments the sheet has a predetermined impact resistance is a Gardner Impact value between 3 and 50 in-lbs; a predetermined impact resistance is a Gardner Impact value of 5 in-lbs or more; and/or a predetermined impact resistance is a Gardner Impact value of about 910 in-lbs at 40 mil thickness.

In one or more embodiments, the PLA sheeting includes a foaming agent, a resin foaming agent for example. In one embodiment the foaming agent creates air pockets or bubbles in the sheeting, such that the PLA sheeting including the foaming agent is lighter in weight than an unfoamed sheeting at the same thickness.mil PLA mil.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. An additive for a PLA article consisting of:
   at least one acrylic impact modifier between 10 and 80 weight % of the total weight of the additive; and
   at least one ethylene vinyl acetate copolymer (EVA) having between 12 and 40 weight % vinyl acetate, the EVA between 5 and 50 weight % of the additive;
   and at least one PLA carrier resin between 5 and 50 weight % of the total weight of the additive; and
   optionally a dye, pigment, or coloring agent.

2. An additive for a PLA article consisting of:
   at least one polylactic acid polymer (PLA) between 10 and 40 weight % of the total weight of the additive;
   at least one acrylic impact modifier between 10 and 80 weight % of the total weight of the additive; and at least one ethylene vinyl acetate copolymer (EVA) having between 12 and 40 weight % vinyl acetate, the ethylene vinyl acetate copolymer between 10 and 20 weight % of the additive; and optionally a dye, pigment, or coloring agent.

3. The additive of claim 2 wherein the additive does not include a dye, pigment or coloring agent.

4. A polylactic acid polymer (PLA) sheet, the sheet consisting of:
   at least one PLA between 90 and 99 weight % of the total weight of the sheet; and
   an additive between 1 and 10 weight % of the total weight of the sheet, the additive consisting of:
      at least one acrylic impact modifier between 10 and 80 weight % of the total weight of the additive; and
      at least one ethylene vinyl acetate copolymer (EVA) having between 12 and 40 wt. % vinyl acetate, the EVA between 10 and 50 weight % of the additive;
      at least one PLA carrier resin between 10 and 50 weight % of the additive; and
      optionally a dye, pigment, or coloring agent.

5. The sheet of claim 4 wherein the additive includes a dye, pigment or coloring agent.

6. The sheet of claim 4 having an impact resistance with a Gardner Impact value between 3 and 50 in-lbs.

7. The sheet of claim 6, wherein the impact resistance has a Gardner Impact value of 5 in-lbs or more.

8. The sheet of claim 4 having a clarity with a Haze percent value of less than 35%.

9. The sheet of claim 8 wherein the clarity has a Haze percent value of between 30 and 60% when the vinyl acetate is less than 25 weight % of the at least one ethylene vinyl acetate copolymer.

10. The sheet of claim 8 wherein the clarity has a Haze percent value of less than 30% when the vinyl acetate is 25 weight % or greater of the at least one ethylene copolymer.

11. A polylactic acid polymer (PLA) sheet, the sheet consisting of:
    at least one PLA between 90 and 98 weight % of the total weight of the sheet; and
    an additive between 2 and 10 weight % of the total weight of the sheet, the additive comprising:
      at least one acrylic impact modifier between 10 and 90 weight % of the total weight of the additive;
      at least one ethylene vinyl acetate copolymer (EVA) having vinyl acetate content between 12 and 40 weight % of the copolymer, the EVA between 5 and 50 weight % of the additive;
      at least one PLA carrier resin between 5 and 50 weight % of the additive; and
      optionally a dye, pigment, or coloring agent.

12. The sheet of claim 11, wherein the additive does not include a dye, pigment or coloring agent.

13. The sheet of claim 11 wherein the additive further includes a dye, pigment or coloring agent.

14. The sheet of claim 11 having an impact resistance with a Gardner Impact value between 3 and 50 in-lbs.

15. The sheet of claim 14 wherein the impact resistance has a Gardner Impact value of 5 in-lbs or more.

16. The sheet of claim 11 having a clarity with a Haze percent value of less than 60%.

17. The sheet of claim 16 wherein the clarity has a Haze percent value between 30 and 60% when the vinyl acetate is less than 25 weight % of the at least one ethylene copolymer.

18. The sheet of claim 16 wherein the clarity has a Haze percent value of less than 30% when the vinyl acetate is 25 weight % or greater of the at least one EVA.

19. A polylactic acid polymer (PLA) sheet, the sheet consisting of:
    at least one PLA between 90 and 98 weight % of the total weight of the sheet;
    at least one acrylic impact modifier between 1.5 and 2.5 weight % of the total weight of the sheet;
    at least one ethylene vinyl acetate copolymer having-vinyl acetate content between 12 and 40 weight %, the ethylene vinyl acetate copolymer being between 0.2 and 0.3 weight % of the sheet; and
    optionally a dye, pigment, or coloring agent.

20. The sheet of claim 19 wherein the sheet further includes a dye, pigment or coloring agent.

21. The sheet of claim 19 having an impact resistance with a Gardner Impact value between 3 and 50 in-lbs.

22. The sheet of claim 21, wherein the impact resistance has a Gardner Impact value of 5 in-lbs or more.

23. The sheet of claim 19 having a clarity with a Haze percent value of less than 35%.

24. The sheet of claim 23 wherein the clarity has a Haze percent value of less than 30% when the vinyl acetate is 25 weight % or greater of the at least one EVA.

25. The sheet of claim 19, wherein the sheet has a gauge of 40 mils.

26. A polylactic acid polymer (PLA) sheet, the sheet-comprising:
    at least one PLA between 90 and 98 weight % of the total weight of the sheet; and
    the additive of claim 1, the additive being present in an amount between 2 and 10 weight % of the total weight of the sheet.

* * * * *